April 30, 1940.　　　　F. W. SLACK　　　　2,198,681
CONTROL FOR POWER TRANSMISSION MECHANISM
Filed April 27, 1938　　　　4 Sheets-Sheet 2
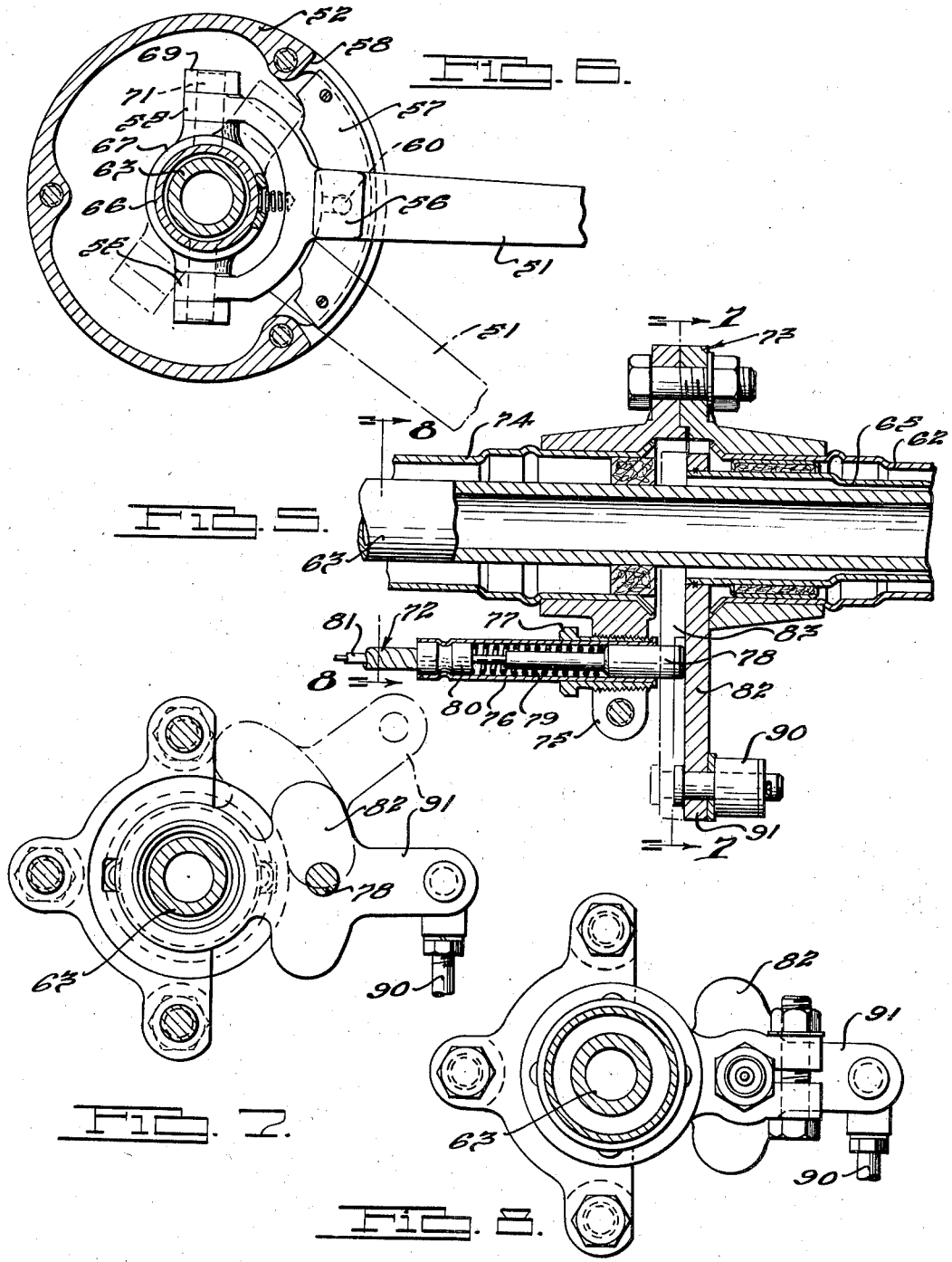
INVENTOR
FREDERIC W. SLACK.
BY
ATTORNEYS.

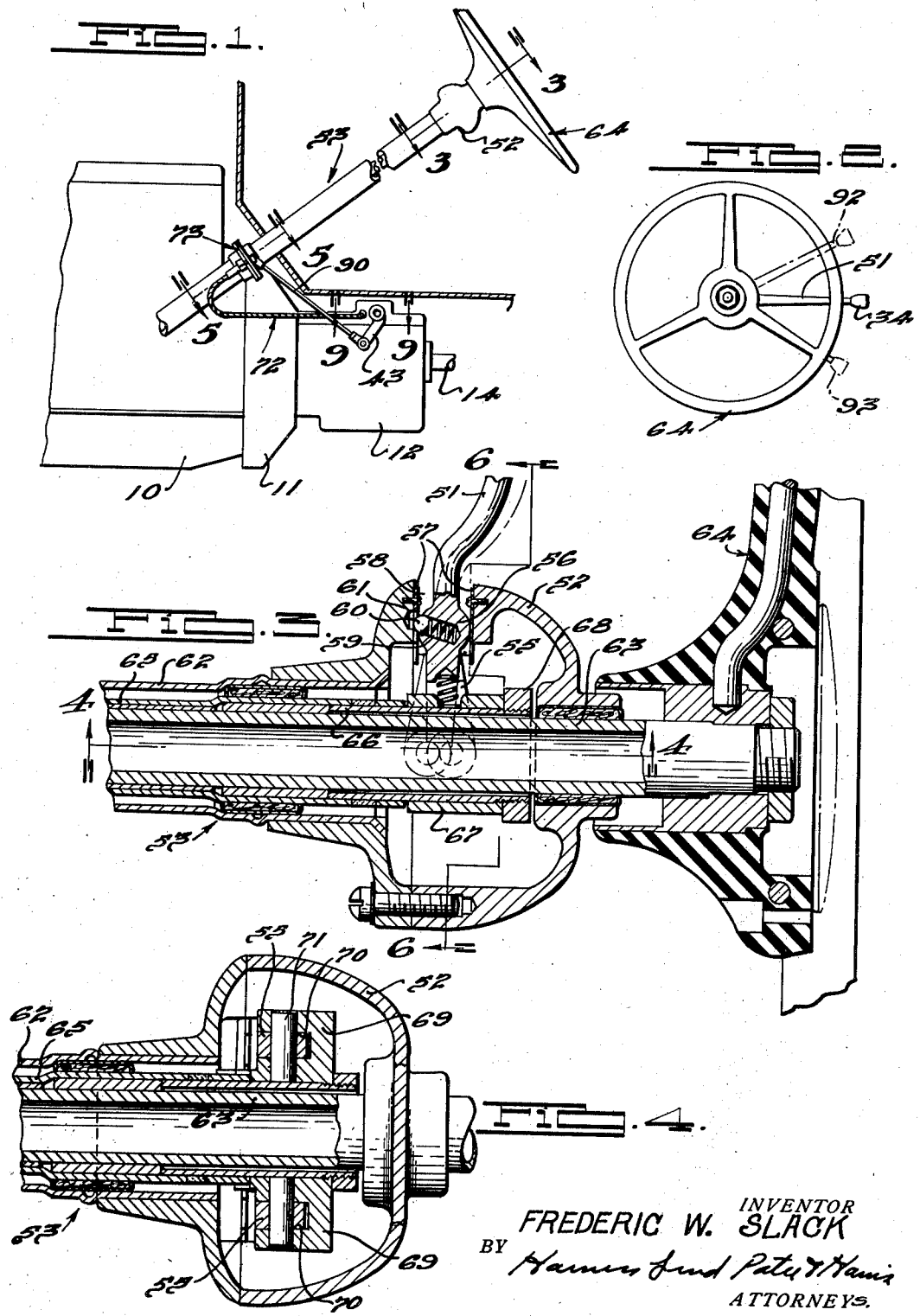

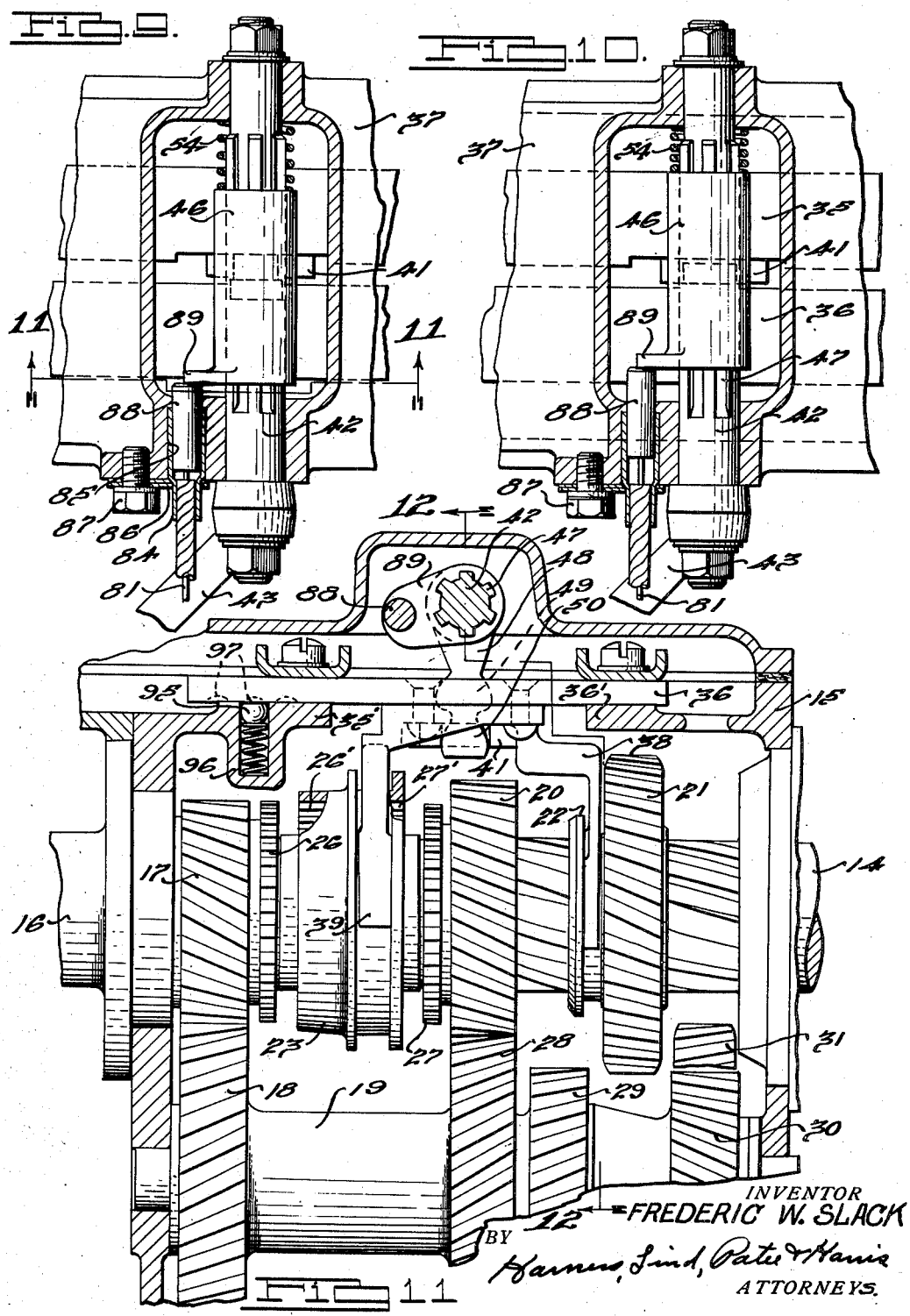

April 30, 1940.  F. W. SLACK  2,198,681
CONTROL FOR POWER TRANSMISSION MECHANISM
Filed April 27, 1938  4 Sheets-Sheet 4
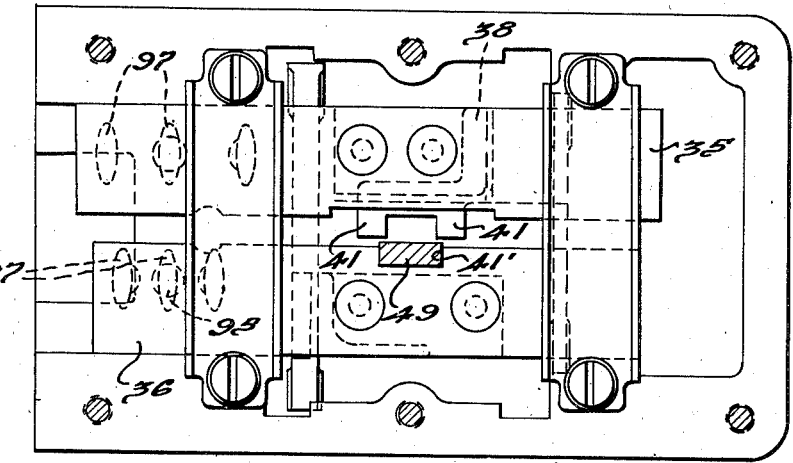
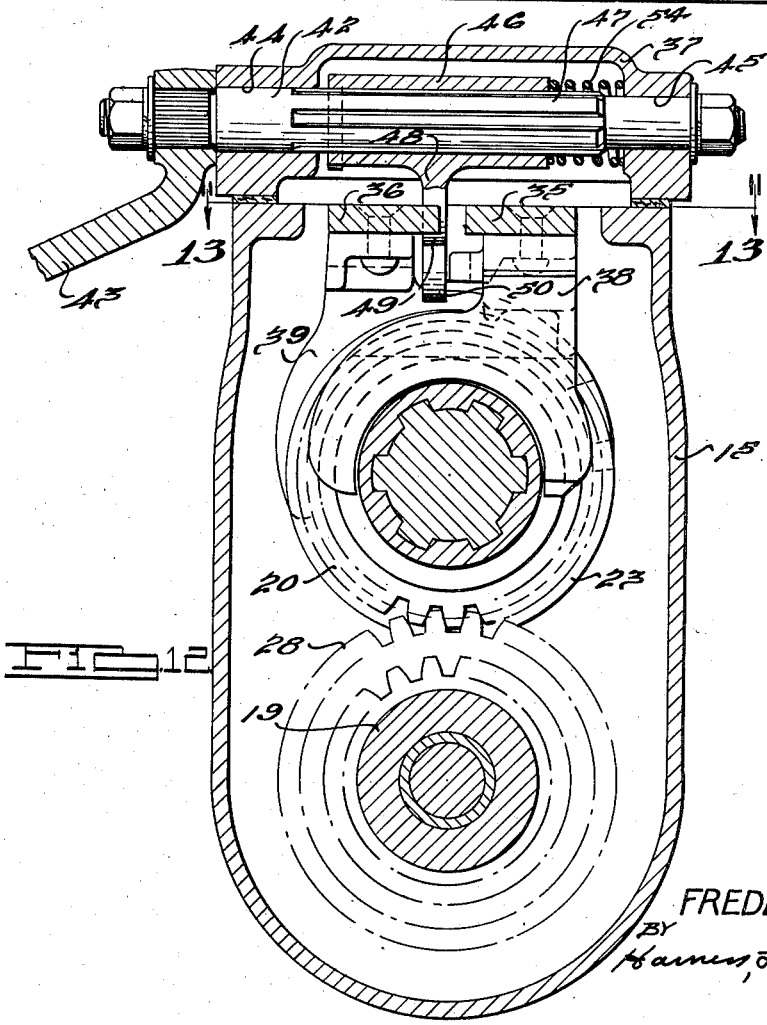
INVENTOR
FREDERIC W. SLACK.
BY
ATTORNEYS.

Patented Apr. 30, 1940

2,198,681

UNITED STATES PATENT OFFICE 2,198,681

CONTROL FOR POWER TRANSMISSION MECHANISM

Frederic W. Slack, Detroit, Mich., assignor to Chrysler Corporation, Highland Park, Mich., a corporation of Delaware Application April 27, 1938, Serial No. 204,570

6 Claims. (Cl. 74—484)

This invention relates to improvements in variable speed transmission mechanism.

More particularly, the invention pertains to improved gear shifting control apparatus for transmissions of this kind which is particularly adapted for use in motor vehicles.

One of the main objects of the invention is the provision of a transmission control apparatus of this character which is adapted to be mounted on the steering column structure of a vehicle.

Another object of the invention is the provision of transmission control apparatus of this kind which has the major part of those portions thereof that extend into the driver's compartment of the vehicle confined within the steering column thereof.

A further object of the invention is the provision in transmission control apparatus of this character of a gear shift lever action by which selection of transmission speed ratio changing elements is accomplished by oscillation of the lever about an axis extending transversely of the steering column and speed ratio changes are effected by oscillation of the lever about an axis substantially parallel to the steering column.

A further object of the invention is the provision of apparatus of this kind which requires inclusion in the steering column of only a single member extending longitudinally thereof for transmitting the selecting and speed ratio changing movements to the transmission mechanism.

Further objects of the invention are the provision of a shaft in a steering column of a vehicle which is shiftable longitudinally thereof and rotatable about its axis for respectively transmitting and selecting the speed ratio changing movements of the manual control lever; to provide in a transmission speed ratio changing system a single chain of mechanism extending from within reach of the driver to the transmission mechanism which is selectively engageable with a pair of different groups of speed ratio changing elements; to provide a flexible cable connection between the steering column mounted parts of the control apparatus and the transmission carried parts thereof for transmitting the speed ratio selecting action of the control lever so as to selectively operatively connect the control apparatus with either of said groups of speed ratio establishing members.

An additional object of the invention is the provision in a vehicle of a driver-operated selector element which is adapted for shifting movements in transversely connected paths in order to produce a plurality of speed ratio changing operations and which is oscillatable in a path connecting the aforesaid paths for selecting which one of the speed ratio establishing elements is to be operated by subsequent movement of the lever in one of the transversely connecting paths.

An illustrative embodiment of the invention is shown in the accompanying drawings, in which Fig. 1 is a diagrammatic, fragmentary, vertical, sectional view of a vehicle showing a transmission mechanism embodying the invention.

Fig. 2 is a plan view of the steering wheel, steering column and gear shift lever assembly shown in Fig. 1.

Fig. 3 is a fragmentary, sectional view taken on the line 3—3 of Fig. 1.

Fig. 4 is a fragmentary, longitudinal, sectional view taken on the line 4—4 of Fig. 3.

Fig. 5 is a fragmentary, longitudinal, sectional view taken on the line 5—5 of Fig. 1.

Fig. 6 is a transverse, sectional view taken on the line 6—6 of Fig. 3.

Fig. 7 is a transverse, sectional view taken on the line 7—7 of Fig. 5.

Fig. 8 is a transverse, sectional view taken on the line 8—8 of Fig. 5.

Fig. 9 is a horizontal, sectional view taken on the line 9—9 of Fig. 1.

Fig. 10 is a horizontal, sectional view similar to Fig. 9 but showing certain parts of the structure disclosed therein in a changed position.

Fig. 11 is a fragmentary, longitudinal, sectional view taken on the line 11—11 of Fig. 9.

Fig. 12 is a transverse, vertical, sectional view taken on the line 12—12 of Fig. 11.

Fig. 13 is a horizontal, sectional view taken on the line 13—13 of Fig. 12.

In the drawings is illustrated an embodiment of the invention in a motor vehicle drive including a unitary power plant having an engine 10, clutch 11 and transmission mechanism, generally designated by the numeral 12, a drive shaft 14 extends rearwardly from the transmission to the rear wheels (not shown) of the vehicle.

The transmission 12 includes a housing 15 into which extends a driving shaft 16, having a gear 17 meshed with a gear 18 fixed on a countershaft 19 which is journalled at its opposite ends in apertures in the end walls of the housing 15. The driven shaft 14 extends into the housing 15 and has a gear 20 journalled on its internal end portion. A slidable gear 21, disposed on the right side of the gear 20 and splined on the shaft 14, is provided with a shifter fork receiving collar 22. Formed on the adjacent sides of the gear 17 and 20 are hub portions which are provided with external clutch teeth 26 and 27 respectively. A shiftable clutch member 23 is splined on the shaft 14 at a location between the hub portion of the gears 17 and 20 and provided with internal clutch teeth 26' and 27' with which the clutch 26 and 27 respectively are adapted to be selectively meshed. A direct drive setting of the gears may be produced by shifting the clutch member 23 to the left, as viewed in Fig. 11, to bring the clutch teeth 26 and 26' into mesh. When the clutch member 23 is shifted to the right the teeth 27 and 27' are meshed thereby holding the gear 20 against rotation relative to the shaft 14. The gear 20 is permanently meshed with a gear 28 on the countershaft 19 by which the gear 20 and shaft 14 are driven to establish a second speed drive. Low speed and reverse settings of the transmission may be established by shifting the gear 21 into mesh with a gear 29 on the countershaft 19 and with a reverse gear 31 driven by a pinion 30 on the countershaft respectively.

A pair of shifter rails 35 and 36 extending longitudinally of the transmission are shiftably mounted on flanges 35' and 36' of the housing 15 which are located at the upper open extremity of the latter. The rail 35 is provided with a downwardly extending fork 38 which engages the collar 22 of the gear 21 and the rail 36 is provided with a downwardly extending fork 39 which is engaged in a groove of the clutch member 23. The fork 38 is provided with a pair of spaced lugs 41 between which is receivable a fork and rail shifting finger, hereinafter described, having a part which is receivable in a notch 41' in the rail 36.

That portion of the control apparatus which is directly connected with the transmission mechanism housing is mounted on a cover 37 which is provided for closing the upper open end of the transmission housing. The cover 37 includes a crowned central portion having opposite side wall portions extending longitudinally of the transmission in which are formed registering openings 44 and 45.

A shaft 42 extending transversely of the cover 37 is journalled at its ends in the openings 44. The shaft 42 has an external end portion protruding from the cover member 37 on which a lever 43 is non-rotatably fixed. A collar 46 is disposed within the cover and axially slidably mounted on the intermediate portion of the shaft 42 which is provided with splines 47 for holding the collar and shaft against relative rotation. The collar 46 carries the rail shifting finger 48, heretofore referred to, which is provided with an intermediate lobe portion 49 that registers with and is adapted to be received by the notch 41' of the rail 36, and a lobe portion 50 that registers with and is receivable between the lugs 41 of the shifter fork 38. A coil spring 54 bears between the right wall of the cover 37 and the right extremity of the collar 46, as viewed in Fig. 12, for normally yieldably urging the collar 46 to the left so as to retain the rail shifting finger 48 in operative engagement with the rail 36 and its shifter fork 39. The collar 46 may be moved rightwardly, as viewed in Fig. 12, to bring the end lobe 50 between the lugs 41 carried by the rail 35 and shifter fork 38.

Apparatus for manually controlling the collar 46 may be mounted at any location in the driver's compartment of the vehicle within convenient reach of the driver. In the form of the invention illustrated, the manual control apparatus comprises a gear shift lever 51 which is carried by a casing 52 having separable sections mounted on the steering column, generally designated by the numeral 53. The manual control lever 51 has a knob 34 on its outer end and it has a forked inner extremity 55 disposed within the casing 52. Provided on the lever 51 adjacent its forked end is a ball-shaped enlargement 56 which is disposed between wear plates 57 mounted on the opposite side walls of an arcuate slot 58 formed in the casing 52 through which the lever extends. The enlarged portion 56 of the control lever has a bore 59 in which a spring-pressed detent 60 is disposed. The detent 60 is adapted to engage in an aperture 61 formed in the wall of the slot 58 when the lever 51 is centrally located with respect to the opposite ends of this slot.

The steering column, generally designated by the numeral 53, includes an outer tube 62 on which the casing 52 is mounted and an inner tubular steering shaft 63 which is provided with a steering wheel, generally designated by the numeral 64. The steering shaft 63 extends longitudinally of the steering column and is centrally located with the longitudinal axis thereof.

A tubular shaft 65 extends longitudinally of the steering column 53 and is axially, slidably and rotatively supported by the steering column structure. Mounted in the upper open end of the tubular shaft 65 is a sleeve 66 which is welded, or otherwise suitably secured, thereto and which extends beyond the upper extremity of this shaft. A collar 67 is concentrically mounted on the portion of the sleeve 66 which extends beyond the shaft 65 and detachably and nonrotatably held thereon by a nut 68 threaded on the right end portion of the sleeve 66 as viewed in Fig. 3. The collar 67 is provided with diametrically opposed bosses 69, shown in Fig. 4, in which are formed slots 70 for receiving the apertured end portions of the prongs of the fork 55. The fork 55 of the lever 51 is pivotally attached to the bosses 69 of this collar by pins 71 extending through registering apertures in the bosses and prongs of the fork respectively. The enlarged portion 56 of the lever 51 serves as a fulcrum about which the lever may be oscillated in a vertical plane, as viewed in Fig. 2, to shift the shaft 65 axially of the steering column in respectively opposite directions. The shaft 65 may be rotated about its axis which is coincident with the longitudinal axis of the steering column by shifting the lever 51 upwardly or downwardly from its full line position shown in Fig. 2 and during this action of the lever, the enlarged portion 56 thereof slides free on the bearing surfaces 57 with which the walls of the slot 58 in the casing 52 are lined.

Axial movement of the shaft 65 is transmitted to the collar 46 by a Bowden wire assembly generally designated by the numeral 72 in Fig. 1. One end of the Bowden wire assembly 72 is mounted on the lower element of a separable coupling 73 by which an extension 74 of the steering column housing 62 is supported. The lower element of the coupling 73 is provided with an apertured flange 75 in which a metal tube 76 is fixed by a threaded fitting 77. Slidably mounted in the tube 76 is a plunger 78 which is normally urged rightwardly, as viewed in Fig. 5, by a coil spring 79 bearing between the plunger and a plug 80 fixed in the left end of the tube 76. A flexible cable 81 extending through the plug 80 is attached to the plunger 78. The plunger 78 bears against a plate 82 which is non-rotatably fixed on the lower extremity of the shaft 65 and which extends outwardly of the coupling 73 through an opening 83 in the side thereof which is substantially twice as wide as the thickness of the plate 82 for accommodating shifting movement of the plate in unison with the axial movement of the shaft 65.

The opposite end of the Bowden wire assembly extends to the cover 37 of the transmission housing to which it is attached by a sleeve 84 disposed in an aperture 85 formed in the cover structure. The sleeve 84 has a reduced outer end portion and an adjacent shoulder which bears against a plate 86 having an aperture therein through which the reduced part of the sleeve extends. The plate 86 is firmly clamped to the transmission cover by a nut 87 threaded in an aperture therein. Fixed to the end of the flexible cable 81 adjacent the transmission mechanism is a plunger 88 which is slidably mounted in the sleeve 84 and which abuts against a flange 89 formed integral with the collar 46. The spring 54 which operates upon the collar 46 normally urges the flexible cable toward the plate 82 of the shaft 65 and thereby urges the shaft upwardly so as to retain the lever 51 in the full line position shown in Fig. 3 with its driver-manipulated end in its lowermost position. When the lever is so disposed, the finger 48 of the collar 46 is engaged in the notch 41' of the shifter rail 36 and oscillatory movement of the lever 51 about the longitudinal axis of the steering column may be employed to rotate the shaft 42 and collar 46 thereon in order to bring the transmission into either a second and high speed drive setting.

Rotative movement of the shaft 65 is transmitted to the shaft 42 and collar 46 by a link 90 pivotally attached at one end to an extension 91 of the plate 82 and pivotally attached at its other end to the crank arm 43 on the shaft 42.

When the driver-operated end of the control lever 51 is in its above-described lower position, movement thereof in a counterclockwise direction about the axis of the steering column to the position designated by the numeral 92 causes the shifter rail 36 to be moved rightwardly as viewed in Fig. 11 so as to mesh the clutch teeth 27 and 27', thereby establishing a second speed ratio setting of the transmission. When the lever 51 is moved in a clockwise direction as viewed in Fig. 2 from its full line position to the dotted line position shown at 93, the shifter bar 36 is shifted leftwardly as viewed in Fig. 11 to engage the clutch teeth 26 and 26', thereby establishing a direct drive setting of the transmission mechanism. Upward movement of the driver-operated end of the lever 51 causes the shaft 65 to be moved downwardly thereby urging the plunger 78 inwardly of its tube 76 and urging the plunger 88 of the Bowden wire assembly outwardly of its tube 84. This movement of the plunger 88 shifts the collar 46 rightwardly, as viewed in Fig. 12, to engage the lobe 50 on the lower end of the finger 78 of the collar, between the lugs 41 which are carried by the shifter rail 35 and fork 38. When the lever 51 is moved in a counterclockwise direction from its full line position shown in Fig. 2 to the dotted line position 92 while the driver-operated end of this lever is in its uppermost position, the shifter rail 35 is moved rightwardly as viewed in Fig. 11 to establish a reverse setting of the transmission mechanism. Clockwise movement of the lever 51 from its full line position shown in Fig. 2 to its dotted line position 93 moves the shifter rail 35 leftwardly as viewed in Fig. 11 to establish a low speed ratio setting of the transmission mechanism.

The shifter rails 35 and 36 are releasably held in an adjusted position by spring-pressed detents 95 mounted in sockets 96 of the transmission housing 15. These detents are adapted to register with and extend into depressions 97 formed in the lower surfaces of the shifter rails, as illustrated in Figs. 11 and 13.

During operation of the selector lever 51, it is thus movable in two transversely connected paths about the longitudinal axis of the steering column. This lever may be moved from one of these paths to another about an axis extending transversely of the longitudinal axis of the steering column. Oscillatory movement of the lever about the longitudinal axis of the steering column effects operation of a selected gear ratio establishing element which is selected for operation by tilting of the lever about an axis extending transversely to the length of the steering column. Both the selection and adjusting actuation of the gear ratio establishing elements are accomplished by employment of only a single shaft extending lengthwise of the steering column structure. With the exception of the operating lever 51 and its mounting, all portions of the transmission control mechanism which project into the driver compartment of the vehicle are confined within the steering column and concealed from view. The advantages of the flexible cable movement transmitting mechanism are obtainable with the foregoing structure which requires only a limited amount of movement to effect a selection between the respective shifter rails of the transmission. The operating lever 51 requires relatively little operating force and is assisted by the spring 54 in returning to its neutral position.

Although but one specific embodiment of the invention is herein set forth, it is recognized that various changes and modifications may be effected in the illustrated application without departing from the spirit of the invention or from the scope of the appended claims.

What I claim is:

1. In a power transmission, a plurality of speed ratio controlling devices operable to effect selective drives through the transmission, a driver operated selector element adapted for shifting movements in transversely connecting paths of corresponding directions to a plurality of stations of transmission control for effecting operation of said speed ratio controlling devices, means for mounting said selector element for swinging movements about a common axis along said paths of corresponding directions, said mounting means including a fulcrum support accommodating rocking movement of an end portion of said selector element in the general direction of said axis, and means operating in response to shift of said selector element for effecting operation of said speed ratio controlling devices including a shaft shiftable axially in response to one of said movements of said selector element and rotatable in response to the other movement thereof and having an outwardly extending crank arm fixed thereto, said means including a member shiftable axially of said shaft having sliding abutting engagement with said crank arm and responsive to only shifting movement of said shaft for selecting one of said devices to be operated and a second member pivotally attached to said crank arm and operable only by rotative movement of said shaft for effecting operation thereof respectively.

2. In a vehicle having a steering column, power transmission mechanism comprising a plurality of speed ratio controlling devices operable to effect selective drives through said transmission, a driver operated selector element adapted for shifting movements in transversely connected paths of corresponding directions to a plurality of stations of transmission control for effecting operation of said speed ratio controlling devices, means for mounting said selector element on said steering column for swinging movements about a common axis extending longitudinally of said steering column along said paths of corresponding directions, said mounting means including a fulcrum support accommodating rocking movement of said selector element about an axis extending transversely of said common axis, a member shiftable longitudinally of said steering column in response to one of said selector element movements and rotatable relative thereto in response to another of said selector element movements and having a crank arm fixed thereto provided with an abutment surface in a plane extending transversely of the rotative axis of said member, and means operatively connected with said member for selectively effecting operation of said speed ratio controlling devices including an element mounted on said steering column for shifting movement axially thereof having sliding abutting engagement with said surface and responsive only to shifting movement of said member and an element pivotally attached to said crank arm responsive only to rotative movement of said member.

3. In a vehicle having a tubular steering column, power transmission mechanism comprising a plurality of speed ratio controlling devices operable to effect selective drives through said transmission, an enlarged casing non-rotatably fixed on said steering column below the steering wheel receiving end portion thereof and having an arcuate slot therein, a driver operated selector element extending through said slot into said steering column adapted for shifting movements in transversely connected paths of corresponding directions to a plurality of stations of transmission control for effecting operation of said speed ratio controlling devices, means for mounting said selector element on said steering column for swinging movements about a common axis extending longitudinally of said steering column along said paths of corresponding directions, said mounting means including a fulcrum support accommodating rocking movement of said selector element about an axis extending transversely of said common axis, a shaft member within and shiftable longitudinally of said steering column in response to one of said selector element movements and rotatable relative thereto in response to another of said selector element movements, a crank arm on said shaft, a shiftable flexible cable having one end in freely abutting engagement with said crank arm, means at the other end of said cable responsive to shifting movement thereof for selecting one of said speed controlling devices, and a linkage pivotally connecting said crank arm and said last-mentioned means for operating said selected speed ratio controlling device.

4. In a vehicle having a tubular steering column; power transmission mechanism comprising a plurality of speed ratio controlling devices, a control shift lever having an end portion extending into said column, means for mounting said lever on said steering column for oscillation about the longitudinal axis thereof and rocking movement about an axis extending transversely of said longitudinal axis, a member extending longitudinally within said steering column shiftable axially thereof in response to movement of said lever about said transverse axis and rotatable relative to said steering column in response to movement of said lever about said longitudinal axis, a crank arm fixed to and extending outwardly from said member, an element for operating upon said speed ratio control devices to effect operation of a selected one thereof, mechanism responsive to said longitudinal shifting of said member for selectively positioning said element to operate upon one of certain of said devices respectively, a part shiftably mounted on said column having abutting engagement with said crank arm and responsive only to axial movement of said member, and mechanism responsive to rotation of said member for actuating said element to bring said selected device into operation including a part attached to said crank arm and responsive to only rotative movement of said member.

5. In a vehicle having a tubular steering column; power transmission mechanism comprising a plurality of speed ratio controlling devices, a control shift lever having an end portion extending into said column, means for mounting said lever on said steering column for oscillation about the longitudinal axis thereof and rocking movement about an axis extending transversely of said longitudinal axis, a member extending longitudinally within said steering column shiftable axially thereof in response to movement of said lever about said transverse axis and rotatable relative to said steering column in response to movement of said lever about said longitudinal axis and having an arm extending outwardly from said column, an element operable by said arm for operating upon said speed ratio control devices to effect operation of a selected one thereof, a spring yieldably holding said element in position to operate upon at least a selected one of said speed ratio controlling devices, mechanism operable by said arm including a flexible cable operable in one direction in response to one of said movements of said member for moving said element against the action of said spring into operative relationship with respect to another of said speed ratio controlling devices, and mechanism responsive to the other movement of said member for actuating said element to effect operation of said last mentioned speed ratio controlling device.

6. In a vehicle having a tubular steering column comprising axially spaced sections, power transmission mechanism comprising a plurality of speed ratio controlling devices, a control shift lever having an end portion extending into said column, means for mounting said lever on said steering column for oscillation about the longitudinal axis thereof and rocking movement about an axis extending transversely of said longitudinal axis, a member extending longitudinally within said steering column shiftable axially thereof in response to movement of said lever about said transverse axis and rotatable relative to said steering column in response to movement of said lever about said longitudinal axis and having an arm extending outwardly from said column between said spaced sections thereof, a sleeve joining said sections having a slot therein for accommodating rotative and axial shifting movement of said arm, an element pivotally attached to and operable by said arm for operating upon said speed ratio control devices to effect operation of a selected one thereof, a plunger slidably mounted on said sleeve and engaging said arm, and means operable by said plunger in response to shifting movement of said member and arm for selecting one of said devices for operation.

FREDERIC W. SLACK.